US012294134B2

(12) United States Patent
Okawa et al.

(10) Patent No.: US 12,294,134 B2
(45) Date of Patent: May 6, 2025

(54) ANTENNA DEVICE

(71) Applicant: KYOCERA Corporation, Kyoto (JP)

(72) Inventors: Yoshihide Okawa, Kirishima (JP); Sentarou Yamamoto, Kagoshima (JP)

(73) Assignee: KYOCERA CORPORATION, Kyoto (JP)

( * ) Notice: Subject to any disclaimer, the term of this patent is extended or adjusted under 35 U.S.C. 154(b) by 156 days.

(21) Appl. No.: 18/031,842

(22) PCT Filed: Oct. 28, 2021

(86) PCT No.: PCT/JP2021/039864
§ 371 (c)(1),
(2) Date: Apr. 13, 2023

(87) PCT Pub. No.: WO2022/092220
PCT Pub. Date: May 5, 2022

(65) Prior Publication Data

US 2023/0387565 A1 Nov. 30, 2023

(30) Foreign Application Priority Data

Oct. 29, 2020 (JP) ................................ 2020-181911

(51) Int. Cl.
*H01Q 1/02* (2006.01)
*H01Q 1/12* (2006.01)
*H01Q 23/00* (2006.01)
*H01Q 1/42* (2006.01)

(52) U.S. Cl.
CPC ................. *H01Q 1/02* (2013.01); *H01Q 1/12* (2013.01); *H01Q 23/00* (2013.01); *H01Q 1/42* (2013.01)

(58) Field of Classification Search
CPC .......... H01Q 1/02; H01Q 1/12; H01Q 1/1221; H01Q 1/42; H01Q 23/00
See application file for complete search history.

(56) References Cited

FOREIGN PATENT DOCUMENTS

| | | | |
|---|---|---|---|
| JP | 2013-159444 | A | 8/2013 |
| JP | 3205663 | U | 8/2016 |
| JP | 2018-048461 | A | 3/2018 |

*Primary Examiner* — Robert Karacsony
(74) *Attorney, Agent, or Firm* — Volpe Koenig

(57) ABSTRACT

An antenna device includes an antenna portion, a connecting portion, and a support. The connecting portion connects the antenna portion and the support. The support is located above the antenna portion and includes a channel extending from an inflow opening located opposite to the antenna portion to an outflow opening located farther from the antenna portion than the inflow opening.

10 Claims, 12 Drawing Sheets

| EXAMPLES | SHAPE OF SUPPORT | L(cm) | PRESENCE OF HEAT PIPE | MAXIMUM TEMPERATURE (°C) |
|---|---|---|---|---|
| 1 | QUADRANGULAR PRISM | 5 | NO | 117.0 |
| 2 | CYLINDER | 5 | NO | 121.4 |
| 3 | HEXAGONAL PRISM | 5 | NO | 121.3 |
| 4 | QUADRANGULAR PRISM | 10 | NO | 122.4 |
| 5 | QUADRANGULAR PRISM | 2 | NO | 114.2 |
| 6 | QUADRANGULAR PRISM | 1 | NO | 116.0 |
| 7 | QUADRANGULAR PRISM | 1.5 | NO | 114.7 |
| 8 | QUADRANGULAR PRISM | 3 | NO | 114.7 |
| 9 | QUADRANGULAR PRISM | 2.5 | NO | 114.3 |
| 10 | QUADRANGULAR PRISM | 2 | YES | 98.1 |

FIG. 11

ANTENNA DEVICE

CROSS-REFERENCE TO RELATED APPLICATIONS

This application is national stage application of International Application No. PCT/JP2021/039864, filed on Oct. 28, 2021, which designates the United States, incorporated herein by reference, and which claims the benefit of priority from Japanese Patent Application No. 2020-18191, filed on Oct. 29, 2020, the entire contents of which are incorporated herein by reference.

TECHNICAL FIELD

An embodiment of the disclosure relates to an antenna device.

BACKGROUND OF INVENTION

A known antenna device is installed outdoors. Such an antenna device is fixed to an electric pole, a road, or the like using, for example, a support or a foundation.

CITATION LIST

Patent Literature

Patent Document 1: JP 2013-159444 A
Patent Document 2: JP 2018-48461 A
Patent Document 3: JP 3205663 UM-B

SUMMARY

An antenna device according to an aspect of an embodiment includes an antenna portion, a connecting portion, and a support. The connecting portion connects the antenna portion and the support. The support is located above the antenna portion and includes a channel extending from an inflow opening located opposite to the antenna portion to an outflow opening located farther from the antenna portion than the inflow opening.

BRIEF DESCRIPTION OF THE DRAWINGS

FIG. 11 is a diagram for comparing radiation characteristics of antenna devices.

DESCRIPTION OF EMBODIMENTS

An embodiment of an antenna device disclosed in the present application will be described in detail below. The disclosure is not limited by the following embodiment.

Embodiment

Figure 1A:
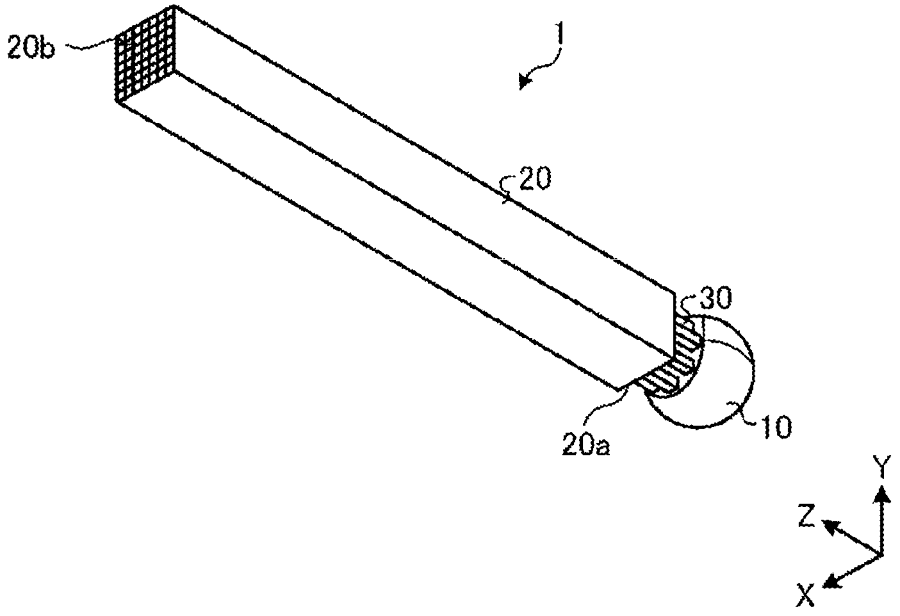
FIG. 1A is a perspective view schematically illustrating an antenna device according to an embodiment.
Figure 1B:
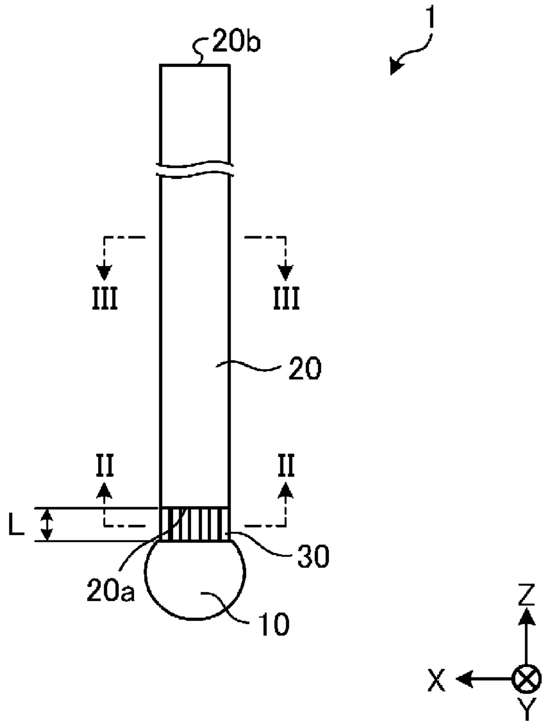
FIG. 1B is a side view schematically illustrating the antenna device according to the embodiment.

First, a configuration of the antenna device according to the embodiment will be described with reference to FIG. 1A and FIG. 1B. FIG. 1A is a perspective view schematically illustrating the antenna device according to the embodiment. FIG. 1B is a side view schematically illustrating the antenna device according to the embodiment. FIG. 1B is a view of one side of a support as viewed in plan view in a perpendicular direction of the one side.

As illustrated in FIGS. 1A and 1B, an antenna device 1 includes an antenna portion 10, a support 20, and connecting portions 30. For the sake of clarity, FIGS. 1A and 1B illustrate a three-dimensional orthogonal coordinate system including a Z axis in which a vertically upward direction is a positive direction. Such an orthogonal coordinate system may also be presented in other drawings used in the description below. In the following description, the Z axis positive direction side may be referred to as "above" for convenience. The same and/or similar components as those of the antenna device 1 illustrated in FIGS. 1A and 1B are denoted by the same reference numerals, and descriptions thereof will be omitted or simplified.

The antenna portion 10 includes, for example, an antenna element mounted on a wiring board. The antenna element includes, for example, an insulation substrate, a patch, and a circuitry. The insulation substrate includes, for example, a dielectric material or other insulation materials. The patch is, for example, an electrical conductor film made of an electrical conductive material such as copper. The circuitry includes, for example, an integrated circuit such as a Radio Frequency Integrated Circuit (RFIC). The patch and the circuitry are, for example, electrically connected to each other via a feed line.

The antenna portion 10 may further include, for example, a support member that supports an antenna element and a heat dissipation member. The heat dissipation member includes, for example, Thermal Interface Material (TIM), and dissipates heat generated by the antenna element.

Such an antenna portion 10 is housed in a housing having a substantially spherical shape. The antenna portion 10 has an outer appearance having a substantially spherical shape as illustrated in FIGS. 1A and 1B.

The support 20 is located above the antenna portion 10. The support 20 supports the antenna portion 10 via the connecting portions 30. The support 20 has a quadrangular prism shape elongated in the Z axis direction. The support 20 is fixed such that a first end 20*a* side closer to the antenna portion 10 is the lower side and a second end 20*b* side away from the antenna portion 10 is the upper side.

The connecting portions 30 are located between the antenna portion 10 and the support 20, and connect the antenna portion 10 and the support 20.

Figure 2:
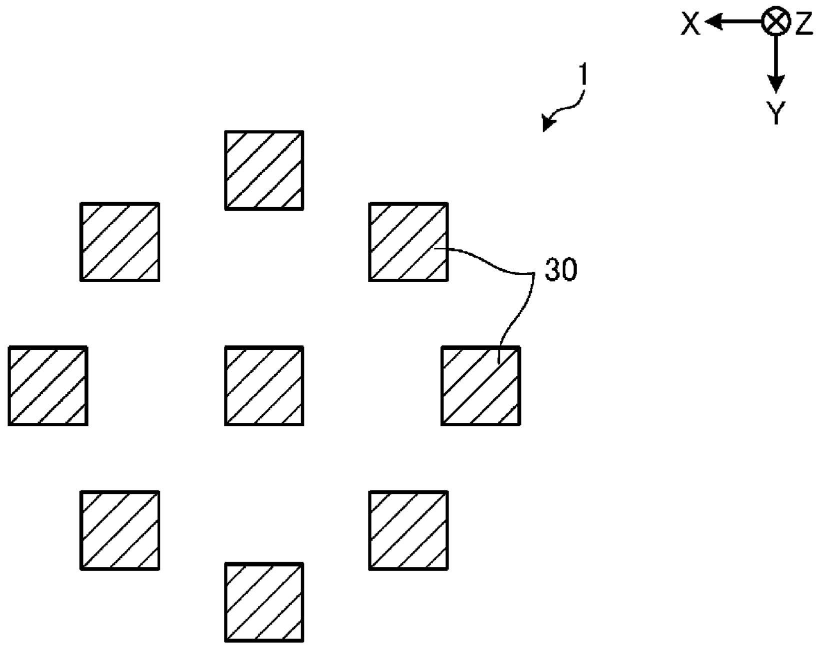
FIG. 2 is a cross-sectional view taken along II-II in FIG. 1B.
Figure 3:
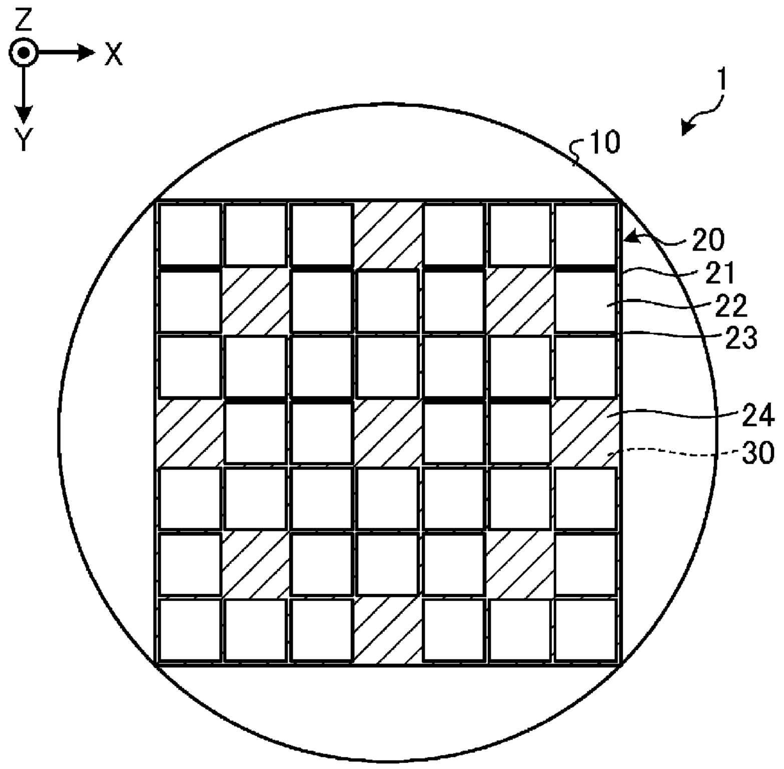
FIG. 3 is a cross-sectional view taken along III-III in FIG. 1B.

Here, configurations of the support 20 and the connecting portions 30 will be further described with reference to FIGS. 1A to 3. FIG. 2 is a cross-sectional view taken along II-II in FIG. 1B. FIG. 3 is a cross-sectional view taken along III-III in FIG. 1B. Note that in FIG. 3, to facilitate understanding of a relationship between an outer shape of the support 20 and an outer shape of the antenna portion 10, a circle having a shape corresponding to the outer shape of the antenna portion 10 is given.

As illustrated in FIGS. 2 and 3, the support 20 includes a plurality of channels 22. Each of the plurality of channels 22 is a through hole that penetrates the inside of the support 20 from the first end 20*a* to the second end 20*b*. The plurality of channels 22 are located side by side in the X axis direction and the Y axis direction, and a partition 23 defining adjacent ones of the plurality of channels 22 is located between the adjacent ones of the plurality of channels 22. In other words, the support 20 is located above the antenna portion 10. The support 20 includes the channels 22 extending from an inflow opening located opposite to the antenna portion 10 to an outflow opening located farther from the antenna portion 10 than the inflow opening. The inflow opening is located at the first end 20*a*. The outflow opening is located at the second end 20*b*.

The support 20 includes heat dissipation portions 24. The heat dissipation portions 24 extend from the first end 20*a* to the second end 20*b* of the support 20 in parallel with the plurality of channels 22. In other words, the heat dissipation portions 24 are disposed to extend along the channels 22.

Each of the heat dissipation portions 24 includes, for example, the plurality of channels 22 arranged in a lattice shape. The heat dissipation portions 24 extend in a height direction (Z axis direction) of the support 20 in a manner that some of the channels 22 among the plurality of channels 22 are blocked, and each of the plurality of channels 22 adjacent to the heat dissipation portion 24 is located in a manner that the periphery of the heat dissipation portion 24 is surrounded. The heat dissipation portions 24 may be located on the outer edge of the support 20, and may serve as a part of a peripheral wall 21 of the support 20.

The support 20 supports the antenna portion 10 via the connecting portions 30, and has a heat dissipation function that contributes to the heat dissipation of the antenna portion 10.

As illustrated in FIG. 2, in a cross-sectional view of the connecting portions 30, for example, members constituting the connecting portions 30 are present in an isolated state. That is, the connecting portions 30 are partially connected to both members of the antenna portion 10 and the support 20. This point will be described with reference to FIG. 4.

Figure 4:
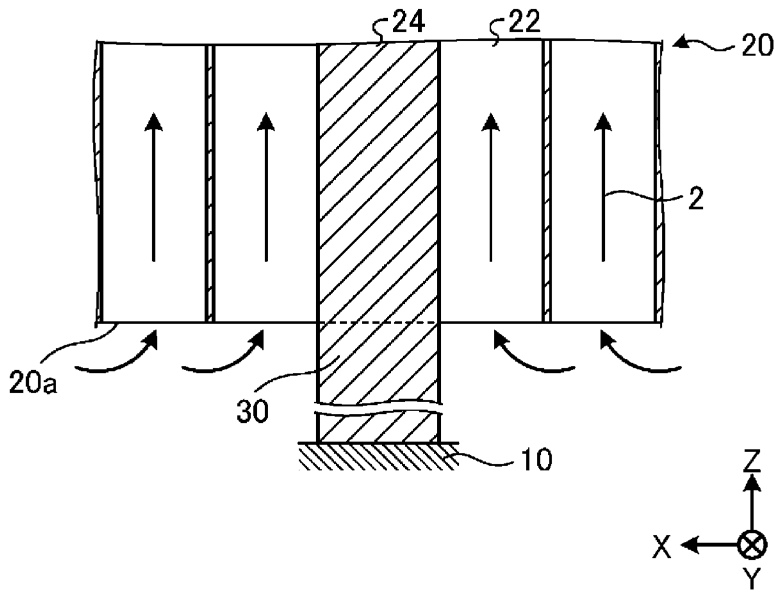
FIG. 4 is a cross-sectional view for explaining heat dissipation by a support.

FIG. 4 is a cross-sectional view for explaining heat dissipation by the support. In FIG. 4, only one connecting portion 30 is illustrated, but other connecting portions 30 also have the same and/or similar configuration. In this case, when heat generated at the antenna portion 10 is transmitted to the heat dissipation portion 24 of the support 20 via the connecting portion 30, the temperature in the channels 22 located around the heat dissipation portion 24 rises. With the temperature rise in the channels 22, the air in the channels 22 moves from the lower side to the upper side in the height direction (Z axis direction) of the support 20 in the channels 22 as indicated by arrows 2, and the outside air is continuously taken in from the first end 20*a* of the channels 22 located at the lower end of the support 20. According to the antenna device 1 according to the embodiment, such a chimney effect is generated, and thus the radiation characteristics of the antenna portion 10 can be enhanced.

As illustrated in FIG. 4, the peripheral wall 21 (member located on the outermost side) constituting the support 20 may include a part where the thickness changes in the longitudinal direction of the support 20. For example, a thinner part and a thicker part of the peripheral wall 21 may be alternately formed in the longitudinal direction of the support 20. The peripheral wall 21 constituting the support 20 may be thinner than the partition 23 of the inside. The peripheral wall 21 constituting the support 20 may include many thinner parts than the partition 23 of the inside. By partially changing the thicknesses of the peripheral wall 21 and the partition 23, the support 20 can be easily deformed. Thus, for example, even when the wall surface of a construction in which the support 20 is installed is curved or bent, the support 20 can be easily made to conform to the shape of the wall surface. The term "construction" includes not only houses and buildings, but also electric poles, traffic lights, roadside trees.

The support 20 may be, for example, a member made of a metal such as an aluminum alloy or the like. The support 20 may be integrally formed by, for example, extrusion molding or other methods, or may be formed by appropriately processing the support 20 that is individually formed for each portion.

Each of the connecting portions 30 is a solid rod shape body located between a respective one of the heat dissipation portions 24 of the support 20 and the antenna portion 10. That is, the connecting portions 30 partially connect the antenna portion 10 and the support 20. In this case, each of the connecting portions 30 may be connected to the heat dissipation portions 24 in the support 20.

An area of a horizontal cross-section of the connecting portions 30 is smaller than an area of a horizontal cross-section of the support 20. Thus, in the periphery of the connecting portions 30, the outside air easily enters the channel 22 from the first end 20*a* side of the support 20, and the radiation characteristics is further enhanced. An increase in the total weight of the antenna device 1 due to the connecting portions 30 can be suppressed. Here, the horizontal cross-section of the connecting portions 30 is a plane indicated by the line II-II in FIG. 1B.

The connecting portions 30 may be, for example, members made of a metal such as an aluminum alloy or the like. The connecting portions 30 may be integrally formed with the support 20 by, for example, extrusion molding or other methods, or may be formed by bonding an individually formed rod shape bodies to the support 20 and/or the antenna portion 10 by welding, adhesion, or the like.

A length L (see FIG. 1B) of the connecting portions 30 that define a distance between the antenna portion 10 and the support 20 can be, for example, from 1 cm to 10 cm, particularly from 1 cm to 5 cm, further from 1.5 cm to 3 cm. By defining the length L in this manner, the radiation characteristics of the antenna device 1 can be enhanced. The length L is not limited to the range described above, and can be appropriately set according to, for example, the number, positions, and sizes of the connecting portions 30.

The number, positions, and sizes of the channels 22 and the heat dissipation portions 24 can be changed as appropriate depending on, for example, a material, a shape, and the like of the support 20.

In the example illustrated in FIG. 3, an outer shape of the support 20 as viewed in the Z axis direction is located to be inscribed in an outer shape of the antenna portion 10.

However, the outer shape of the support 20 may be larger than or smaller than the outer shape of the antenna portion 10. As illustrated in FIG. 3, when the outer shape of the support 20 is rectangular, and the outer shape of the antenna portion 10 is circular, and for example, the outer shape of the antenna portion 10 is small enough to fit into the outer shape of the support 20, the outside air easily flows into the channels 22 of the support 20 from the antenna portion 10 side in the Z axis. Thus, the radiation characteristics of the antenna portion 10 is further enhanced.

Variations

Figure 5:
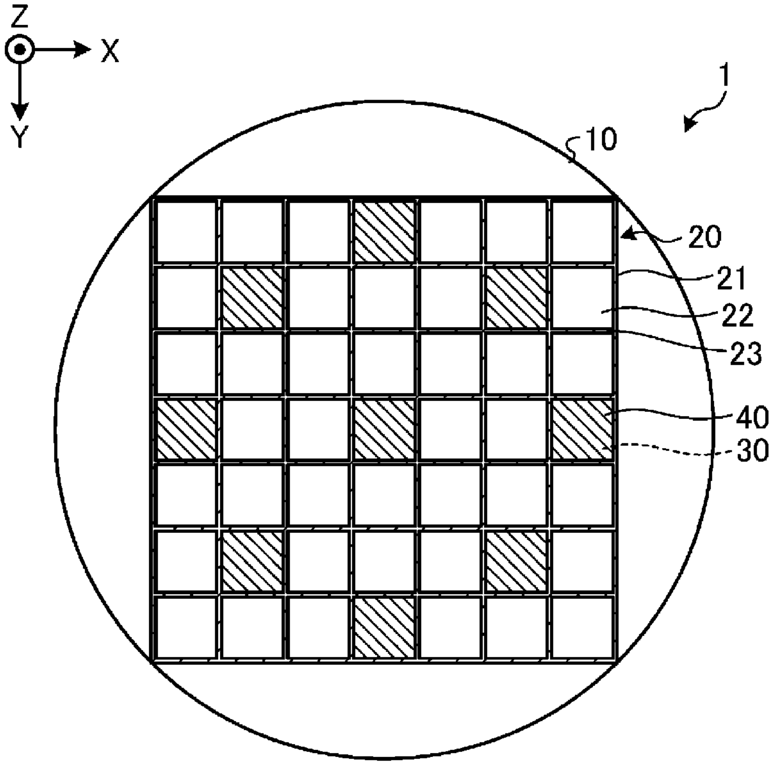
FIG. 5 is a cross-sectional view schematically illustrating the antenna device according to a first variation of the embodiment.

A variation of the antenna device 1 will be described with reference to FIGS. 5 to 10. FIG. 5 is a cross-sectional view schematically illustrating the antenna device according to a first variation of the embodiment. FIG. 5 illustrates a cross-section at the same position as in FIG. 3. As the same as or similar to FIG. 3, in FIG. 5, to facilitate understanding of the relationship between the outer shape of the support 20 and the outer shape of the antenna portion 10, the circle having the shape corresponding to the outer shape of the antenna portion 10 is given.

The antenna device 1 illustrated in FIG. 5 differs from the antenna device 1 according to the embodiment in that the antenna device 1 includes heat dissipation portions 40 instead of the heat dissipation portions 24 of the support 20. The heat dissipation portions 40 have a higher coefficient of thermal conductivity than other portions such as the peripheral wall 21 and the partition 23 of the support 20. Thus, the radiation characteristics of the antenna portion 10 can be further enhanced. As a material of the heat dissipation portions 40, for example, a metal material such as copper having a higher coefficient of thermal conductivity than the material of the support 20 can be used.

Note that a material of the connecting portions 30 may be the same as the material of the heat dissipation portions 40. By making the connecting portions 30 from the same material as the material of the heat dissipation portions 40, the radiation characteristics are further enhanced.

Figure 6:
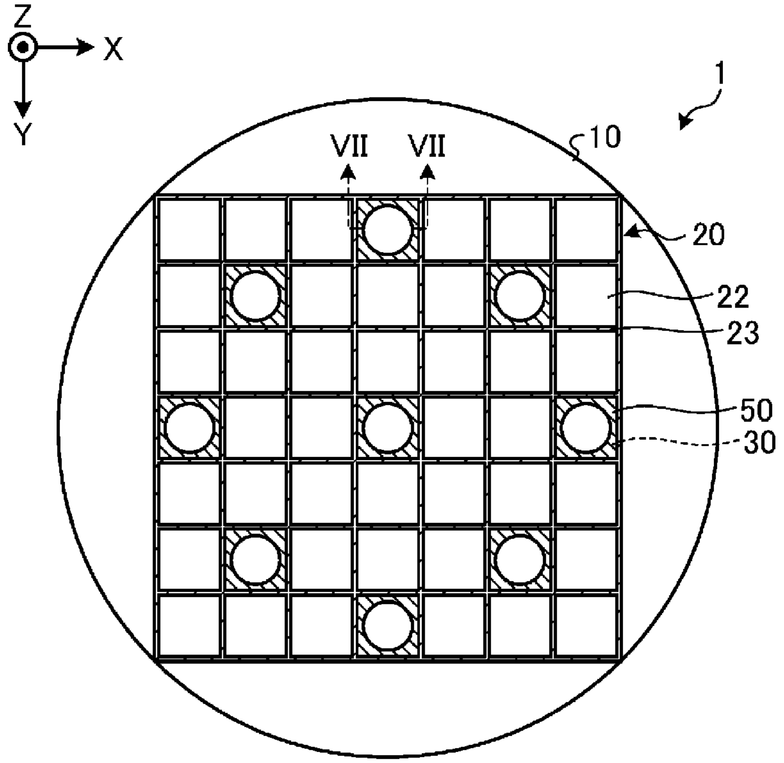
FIG. 6 is a cross-sectional view schematically illustrating the antenna device according to a second variation of the embodiment.

FIG. 6 is a cross-sectional view schematically illustrating the antenna device according to a second variation of the embodiment. FIG. 6 illustrates a cross-section at the same position as in FIG. 3. Also in FIG. 6, to facilitate understanding of the relationship between the outer shape of the support 20 and the outer shape of the antenna portion 10, a circle having a shape corresponding to the outer shape of the antenna portion 10 is given. The antenna device 1 illustrated in FIG. 6 differs from the antenna device 1 according to the first variation in that the antenna device 1 includes heat pipes 50 instead of the heat dissipation portions 40.

Figure 7:
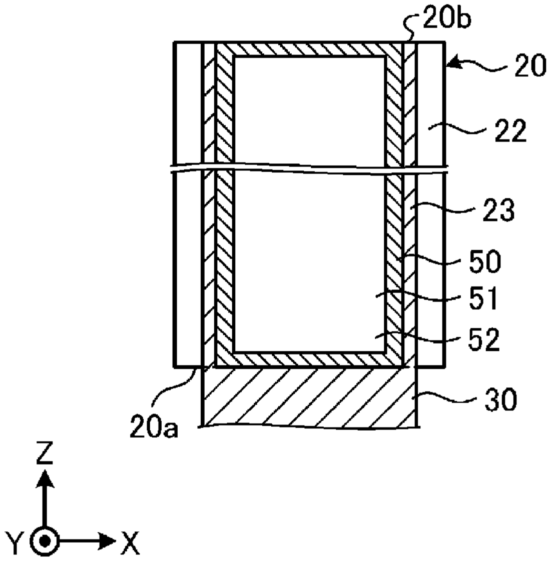
FIG. 7 is a cross-sectional view taken along VII-VII in FIG. 6.

FIG. 7 is a cross-sectional view taken along VII-VII in FIG. 6. As illustrated in FIG. 7, the heat pipe 50 includes a hollow portion 51 at an inner portion thereof. The hollow portion 51 is sealed with a cooling medium 52. The cooling medium 52 is vaporized when the heat pipe 50 is heated, and is condensed when the heat pipe 50 is cooled. A material of the heat pipe 50 may be, for example, copper. The cooling medium 52 may be, for example, water or a substitute for CFCs (e.g., HFC-134a).

The heat pipe 50 illustrated in FIG. 7 is located from the first end 20*a* to the second end 20*b* of the support 20, and is not located in the connecting portion 30. However, the heat pipe 50 may be located, for example, from an inner portion of the connecting portion 30 to the second end 20*b* of the support 20. The heat pipe 50 need not be located, for example, up to the second end 20*b* of the support 20. In such a case, above the heat pipe 50, for example, the heat dissipation portion 24 or the heat dissipation portion 40 may be located up to the second end 20*b* of the support 20. The heat pipe 50 is disposed along the channel 22 at an inner portion of at least one of the support 20 or the heat dissipation portion 24.

The antenna device 1 according to the above-described embodiment and each of the variations is described as including any one of the heat dissipation portions 24 and 40 and the heat pipes 50, but may include two or more types of heat dissipation mechanisms, such as, for example, the heat dissipation portions 24 and heat pipes 50.

In the antenna device 1 according to the above-described embodiment and each of variations, the connecting portions 30 are described as the solid rod shape bodies, but may be, for example, hollow tubular bodies. Making the inner portion of each of the connecting portions 30 hollow makes it possible to contribute to weight reduction of the antenna device 1. As the same as and/or similar to the heat pipes 50 described above, the hollow may be sealed with the cooling medium 52, and thus the radiation characteristics in the connecting portions 30 can be further enhanced.

Figure 8:
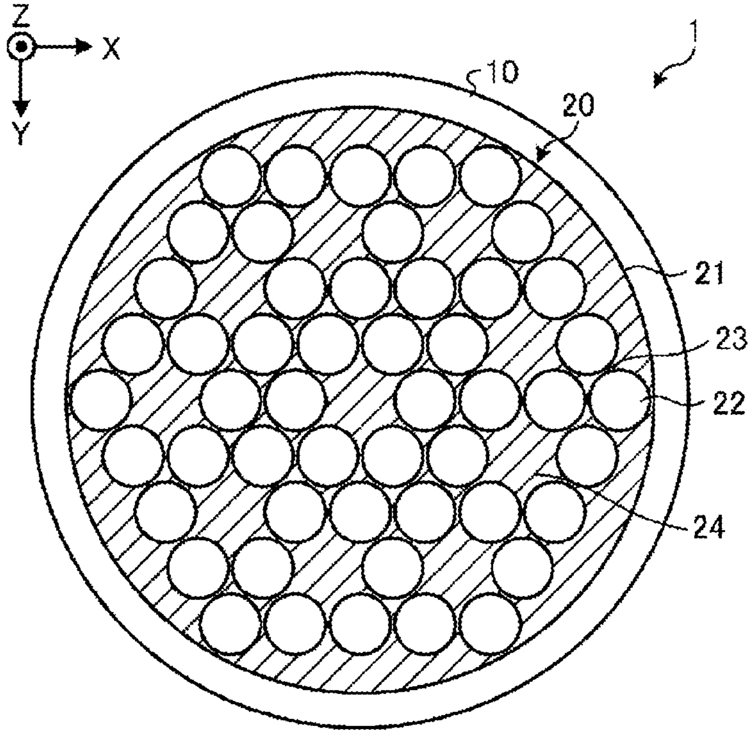
FIG. 8 is a cross-sectional view schematically illustrating the antenna device according to a third variation of the embodiment.
Figure 9:
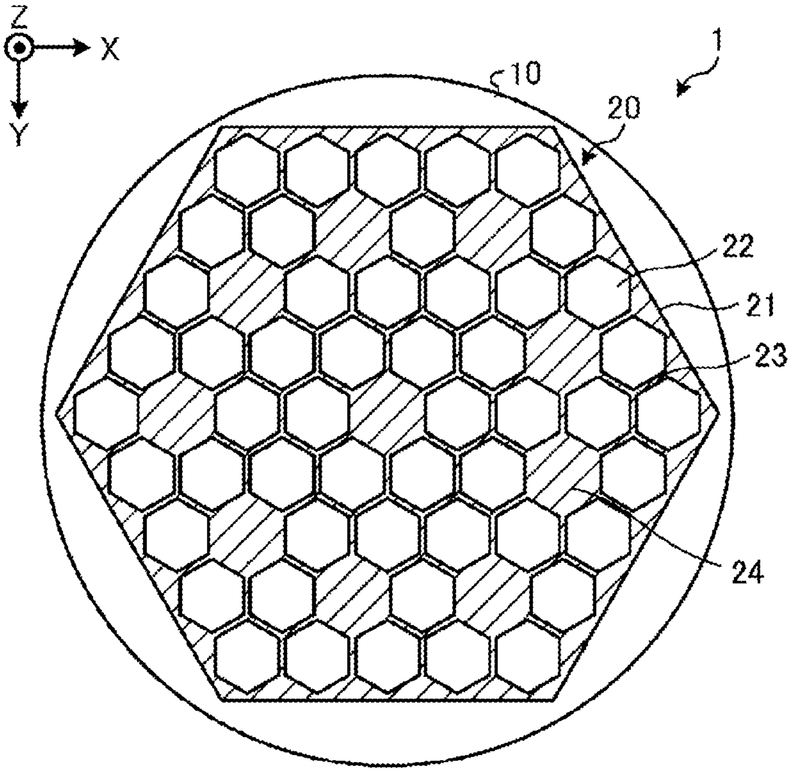
FIG. 9 is a cross-sectional view schematically illustrating the antenna device according to a fourth variation of the embodiment.

FIGS. 8 and 9 are cross-sectional views each schematically illustrating the antenna device according to a third and a fourth variations of the embodiment. FIG. 8 and FIG. 9 also illustrate cross-sections at the same position as in FIG. 3. Also, in FIG. 8 and FIG. 9, to facilitate understanding of the relationship between the outer shape of the support 20 and the outer shape of the antenna portion 10, the circle having a shape corresponding to the outer shape of the antenna portion 10 is given.

As illustrated in FIG. 8, the antenna device 1 according to the third variation differs from each antenna device 1 described above in that the shape of the cross-section (outer shape) of the support 20 is circular. The support 20 constituting the antenna device 1 according to the third variation has an outer appearance having a cylindrical shape. The antenna device 1 according to the fourth variation illustrated in FIG. 9 differs from each antenna device 1 described above in that the shape of the cross-section (outer shape) of the support 20 is a hexagon. The support 20 constituting the antenna device 1 according to the fourth variation has an outer appearance having a hexagonal prism shape. In this way, the support 20 may have a pillar shape elongated in the Z axis direction, and the shape of the support 20 is not particularly limited.

The antenna device 1 illustrated in FIG. 8 includes the plurality of channels 22 that are through holes each having a cylindrical shape. The antenna device 1 illustrated in FIG. 9 includes the plurality of channels 22 that are through holes each having a cross-section of a hexagonal shape. The channels 22 formed in the support 20 may include the plurality of channels 22 extending in the Z axis direction. A shape of each of the channels 22 and a shape of each of the heat dissipation portions 24 associated with an array of the channels 22 are not particularly limited. For example, the shapes may be deformed by a shape of the wall surface of the construction in which the support 20 is installed. When the wall surface of the construction is, for example, curved, the support 20 may also be deformed to conform the wall surface of the construction. When the support 20 has a shape to conform the wall surface of a building, a portion of the support 20 protruding from the wall surface is reduced, and thus, a probability that the support 20 is damaged or deformed due to collision of an object or the like is reduced. Harmony with an outer appearance of the building is maintained.

Figure 10:
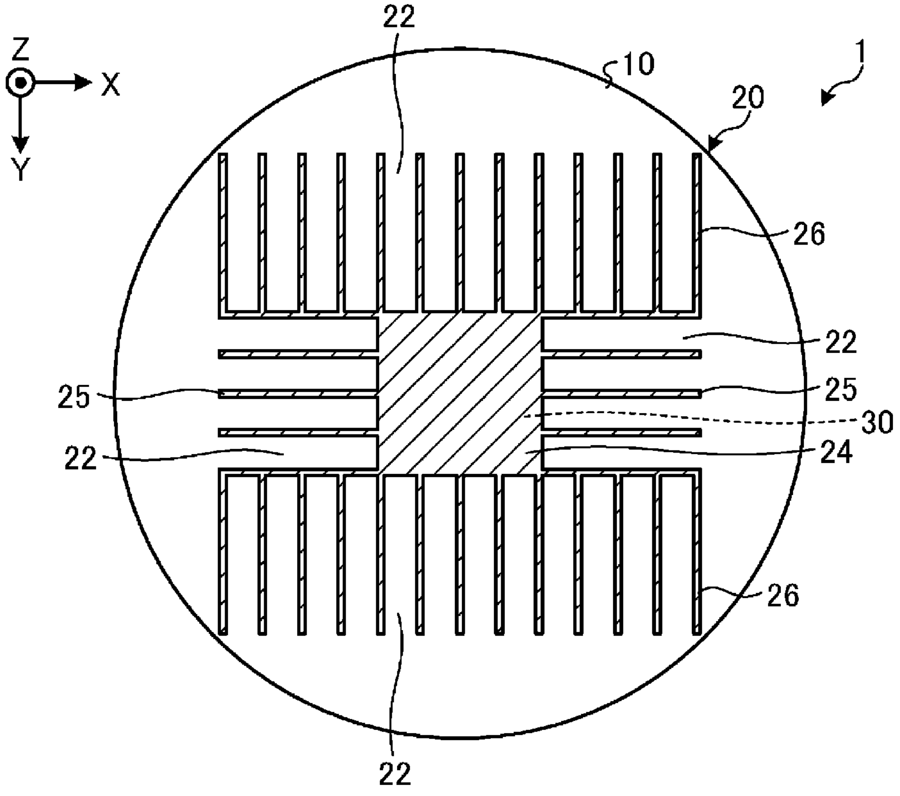
FIG. 10 is a cross-sectional view schematically illustrating the antenna device according to a fifth variation of the embodiment.

FIG. 10 is a cross-sectional view schematically illustrating the antenna device according to a fifth variation of the embodiment. FIG. 10 also illustrates a cross-section at the same position as in FIG. 3. Also in FIG. 10, to facilitate understanding of the relationship between the outer shape of the support 20 and the outer shape of the antenna portion 10, a circle having a shape corresponding to the outer shape of the antenna portion 10 is given.

The support 20 constituting the antenna device 1 illustrated in FIG. 10 includes a heat dissipation portion 24, a plurality of first fin members 25, and a plurality of second fin members 26. The heat dissipation portion 24 is located at a center of the support 20. A shape of the cross-section of the heat dissipation portion 24 is rectangular (square in the case of FIG. 10). The plurality of first fin members 25 and the plurality of second fin members 26 are fixed to side surfaces of the heat dissipation portion 24 at approximately equal intervals.

The plurality of first fin members 25 are disposed on the side surface of the heat dissipation portion 24 in the Y direction. The plurality of second fin members 26 are disposed on the side surface of the heat dissipation portion 24 in the X direction. The plurality of first fin members 25 are fixed to the side surface of the heat dissipation portion 24 perpendicular to the X direction. The plurality of second fin members 26 are fixed to the side surface of the heat dissipation portion 24 perpendicular to the Y direction.

An end portion of each of the plurality of the first fin members 25 opposite to the heat dissipation portion 24 is oriented away from the side surface of the heat dissipation portion 24. An end portion of each of the plurality of the second fin members 26 opposite to the heat dissipation portion 24 is oriented away from the side surface of the heat dissipation portion 24. A length of each of the plurality of first fin members 25 from the side surface of the heat dissipation portion 24 to the end portion is the same, but the length may be changed along with the outer shape of the antenna portion 10. For example, a space between two first fin members 25 is the channel 22. A space between two second fin members 26 is the channel 22. That is, the antenna device 1 illustrated in FIG. 10 includes the support 20 including the plurality of first fin members 25 whose adjacent ones sandwich the channel 22 and the plurality of second fin members 26 whose adjacent ones sandwich the channel 22. The plurality of first fin members 25 are located at intervals in the Y axis direction. Each of the first fin members 25 extends along a ZX plane from the heat dissipation portion 24, and the channel 22 is located between adjacent ones of the first fin members 25.

On the other hand, the plurality of second fin members 26 are located at intervals in the X axis direction. Each of the second fin members 26 extends along a YZ plane from the heat dissipation portion 24 and the first fin members 25, and the channel 22 is located between adjacent ones of the second fin members 26.

The antenna device 1 according to the present variation differs from each antenna device 1 according to the embodiment and the variations described above in that a plurality of the channels 22 are located outside the support 20. In this way, even when the plurality of channels 22 are located outside the support 20, the antenna device 1 can be properly dissipated.

Although the embodiments of the present disclosure have been described above, the present disclosure is not limited to the embodiments described above, and various modifications can be made without departing from the spirit thereof.

Experimental Example

FIG. 11 is a diagram for comparing radiation characteristics of antenna devices. In FIG. 11, in experimental examples 1 to 3, the influence of differences in shape of the support 20 on the heat dissipation performance was evaluated. In experimental examples 1 and 4 to 9, the influence of differences in the length L of the connecting portions 30 illustrated in FIG. 1B on the heat dissipation performance was evaluated. In experimental examples 5 and 10, differences of the heat dissipation performance due to the presence of the heat pipes 50 (see FIGS. 6 and 7) were compared.

In the experimental example 1, in the antenna device 1 illustrated in FIGS. 1A to 3, the support 20 having a quadrangular prism shape, in which lengths in the X axis direction, the Y axis direction, and the Z axis direction are 105 mm, 105 mm, and 1000 mm, respectively, was used. An aluminum alloy having a coefficient of thermal conductivity=222 W/(m·K) was used as a material of the support 20 and the connecting portions 30. A thickness of the partition 23=1 mm, a dimension of the channels 22 in a cross-sectional view along the XY plane=14 mm×14 mm, and the length of the connecting portions 30 illustrated in FIG. 1B L=5 cm. In the experimental examples 4 to 9, the antenna device 1 having the same dimensions as in the experimental example 1 was prepared except that the length L of the connecting portions 30 was changed.

In the experimental example 2, in the antenna device 1 illustrated in FIG. 8, the support 20 having a cylindrical shape was used, in which the first end 20*a* and the second end 20*b* along the XY plane were circular with a diameter of 120 mm and a length in the Z axis direction was 1000 mm. A cross-sectional shape of each of the channels 22 along the XY plane was circular with a diameter of 15 mm, and the length L of each of the connecting portions 30 illustrated in FIG. 1B=5 cm.

In the experimental example 3, in the antenna device 1 illustrated in FIG. 9, the support 20 having a hexagonal prism shape was used. in which the first end 20*a* and the second end 20*b* along the XY plane were equilateral hexagons having substantially the same cross-sectional area as that of the support 20 according to the experimental example 2, and the length in the Z axis direction was 1000 mm. The cross-sectional shape of each of the channels 22 along the XY plane was an equilateral hexagon having a cross-sectional area similar to that of each of the channels 22 according to the experimental example 2, and the length L of each of the connecting portions 30 illustrated in FIG. 1B=5 cm.

In the experimental example 10, the antenna device 1 to which the heat pipes 50 having the coefficient of thermal conductivity=50000 W/(m·K) was applied was used instead of the heat dissipation portions 24 of the antenna device 1 according to the experimental example 5.

Note that in FIG. 11, results obtained by measuring each of the maximum temperatures of the antenna device 1 under the same energization condition of the antenna device 1 according to each experimental example are shown. Here, the term "maximum temperature" refers to a temperature at a site where a surface temperature is highest in the antenna element housed in the antenna portion 10.

As shown in FIG. 11, when comparing the experimental examples 1 to 3, in the antenna device 1 according to the experimental example 1 using the support 20 having the quadrangular prism shape, the maximum temperature of the antenna portion 10 was reduced as compared with the antenna device 1 according to the experimental examples 2 and 3. It is conceivable that this is because the areas of the first end 20*a* and the second end 20*b* are different, and the surface area of the partition wall 23 in contact with the channel 22 is different. Note that it was confirmed that the antenna device 1 according to the experimental examples 2 and 3 also had the radiation characteristics suitable for actual use.

It was confirmed that when comparing the experimental examples 1 and 4 to 9, in the antenna device 1 according to the experimental example 5 with the length L=2 cm, the maximum temperature of the antenna portion 10 was lowest and indicated the minimum value. Note that it was confirmed that the antenna device 1 according to the experimental examples 1, 4 and 6 to 9 also had the radiation characteristics suitable for actual use.

When comparing the experimental examples 5 and 10, the experimental example 10 to which the heat pipes 50 were applied further reduced the maximum temperature of the antenna portion 10 as compared with the experimental example 5. It was confirmed that the antenna device 1 to which the heat pipes 50 were applied had higher radiation characteristics as compared with the antenna device 1 to which the heat pipes 50 were not applied.

Further effects and variations can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An antenna device comprising:

an antenna portion;

a connecting portion; and a support, wherein the connecting portion connects the antenna portion and the support, the support is located above the antenna portion and comprises a channel extending from an inflow opening located opposite to the antenna portion to an outflow opening located farther from the antenna portion than the inflow opening.

2. The antenna device according to claim 1, wherein the channel comprises a through hole penetrating the support in a height direction.

3. The antenna device according to claim 1, wherein the support comprises a heat dissipation portion extending along the channel.

4. The antenna device according to claim 3, wherein the heat dissipation portion has a higher coefficient of thermal conductivity than a coefficient of thermal conductivity of other parts of the support.

5. The antenna device according to claim 3, wherein the support comprises a heat pipe along the channel at an inner portion of the support.

6. The antenna device according to claim 3, wherein the connecting portion is connected to the heat dissipation portion in the support.

7. The antenna device according to claim 6, wherein an area of a horizontal cross-section of the connecting portion is smaller than an area of a horizontal cross-section of the support.

8. The antenna device according to claim 1, wherein the connecting portion is a plurality of rod shape bodies extending in the same direction as the channel.

9. The antenna device according to claim 8, wherein each of the plurality of rod shape bodies is a hollow tubular body.

10. The antenna device according to claim 3, wherein the heat dissipation portion comprises a heat pipe along the channel at an inner portion of the heat dissipation portion.

* * * * *